Nov. 4, 1958
B. F. FORT, JR
2,858,901
ADSORPTION PROCESS
Filed July 11, 1955
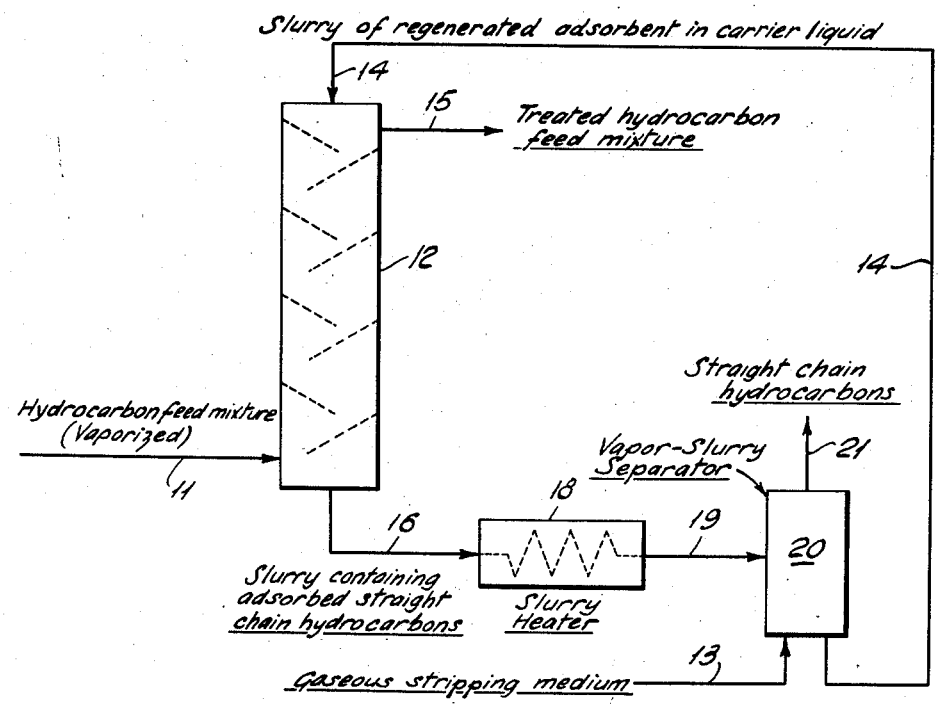

United States Patent Office
2,858,901
Patented Nov. 4, 1958

2,858,901

ADSORPTION PROCESS

Ben F. Fort, Jr., Port Arthur, Tex., assignor to The Texas Company, New York, N. Y., a corporation of Delaware Application July 11, 1955, Serial No. 521,166

2 Claims. (Cl. 183—114.2)

This invention relates to a method of fractionating mixtures. More particularly, this invention relates to an adsorption separation process employing special adsorbent materials. In accordance with one embodiment this invention relates to an adsorption separation process for fractionating hydrocarbon mixtures, such as hydrocarbon fractions containing straight chain hydrocarbons and non-straight chain hydrocarbons.

Certain materials, solid selective adsorbents, have been proposed to effect a separation of materials based on differences in molecular size or configuration. Solid selective adsorbents which fractionate mixtures according to the molecular size of the components therein have been termed "molecular sieves." For example, Barrer—U. S. 2,306,610 has proposed to effect a separation between straight chain hydrocarbons and non-straight chain hydrocarbons by contacting a mixture containing the same with a special selective adsorbent, a porous crystalline zeolite the crystals of which possess pores of uniform molecular dimension, about 5 angstrom units, which permit the entry and adsorption of straight chain hydrocarbons, such as normal paraffins and normal olefins, to the substantial exclusion of non-straight chain hydrocarbons, such as isoparaffins, isoolefins, naphthenes and aromatic hydrocarbons.

Certain other solid selective adsorbents, such as certain naturally occurring zeolites and alumino-silicate type molecular sieve adsorbents, have been proposed to effect a selective adsorption of certain components of a mixture in contact therewith. The zeolite or alumino-silicate type molecular sieve adsorbents, however, are relatively fragile solid materials, possessing little structural strength and are readily and easily crushed and reduced to a powder. This lack of structural strength and ability to resist attrition and crushing has militated against employing such solid adsorbents in separation processes wherein the solid adsorbent is moved from one zone to another zone, such as form an adsorption zone to a desorption zone. In fact, in the case of alumino-silicate molecular sieve type of adsorbents the loss of solid adsorbent material which might arise due to attrition and crushing has been prohibitive heretofore with respect to the use of these materials in any treating process other than one employing a fixed bed of such solid adsorbent material.

Accordingly it is an object of this invention to provide an improved selective adsorption separation process for the fractionation of mixtures.

Another object of this invention is to provide an adsorption separation process wherein solid adsorbent material which is normally fragile and easily crushed may be satisfactorily employed.

Still another object of this invention is to provide a special adsorption separation process wherein alumino-silicate molecular sieve type of adsorbents are conveniently and readily moved from one zone such as an adsorption zone to another zone such as a desorption zone.

How these and other objects of this invention are accomplished will become apparent with reference to the accompanying disclosure and drawing which schematically illustrates a selective adsorption process in accordance with this invention suitable for the treatment or fractionation of a gaseous or vaporized feed mixture.

In at least one embodiment of this invention at least one of the foregoing objects will be achieved.

In accordance with this invention a feed mixture to be fractionated is contacted with a solid, particle-form selective adsorbent for one of the components of said mixture, said solid, particle-form adsorbent being admixed as a slurry with an inert carrier liquid. Accordingly, this invention comprises an adsorptive separation process for the fractionation of mixtures wherein the feed mixture, such as a gaseous or vaporized mixture of hydrocarbons, to be fractionated is contacted with a slurry comprising a substantially inert carrier liquid and a solid, particle-form selective adsorbent for one of the components present in said feed mixture.

Although the practice of this invention is particularly applicable to any solid selective adsorbent which possesses relatively little structural strength and ability to resist crushing and attrition or which is ultimately reduced by attrition to a finely divided powder, such as a powder having an average particle size in the range 0.5–5.0 microns, smaller or larger, and accordingly subject to loss in the absence of suitable and/or special adsorbent recovery means, for purposes of simplicity and ease of understanding emphasis will be placed in this disclosure on the applicability of this invention to the molecular sieve type of solid adsorbents, such as alumino-silicate solid adsorbents which selectively adsorb one hydrocarbon type, such as straight chain hydrocarbons, to the substantial exclusion of other hydrocarbon types, such as non-straight chain hydrocarbons. Broadly, however, in the practice of this invention any desired solid, particle-form selective adsorbent may be employed depending upon the component or components to be selectively adsorbed from the feed mixture undergoing treatment. Suitable solid adsorbents which may be employed in the practice of this invention include activated charcoal or carbon, naturally occurring or treated clays, activated alumina, synthetic adsorbent materials, such as silica gels, natural, modified or synthetic zeolites or alumino-silicates and the like.

Certain natural or synthetic zeolites or alumino-silicates, such as a calcium alumino-silicate, exhibit the properties of a molecular sieve adsorbent in that they are made up of porous crystals wherein the pores of the crystals are of molecular dimension and are of substantially uniform size. These materials may be described as water-containing alumino-silicates having the formula $$(R,R'_2)O.Al_2O_3.nSiO_2.mH_2O$$ 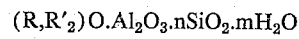

wherein R may be an alkaline earth metal such as calcium, strontium or barium or even magnesium and wherein R' is an alkali metal such as sodium or potassium or lithium. Generally the above-described materials, when treated for the removal of substantially all of the water therefrom, retain their crystal structure and are particularly suitable as selective adsorbents for certain types of compounds, such as adsorbents for the selective adsorption of straight chain hydrocarbons to the substantial exclusion of non-straight chain hydrocarbons.

A particularly suitable solid adsorbent for straight chain hydrocarbons, and suitable for use in the practice of this invention, is a calcium alumino-silicate, apparently actually a sodium calcium alumino-silicate, manufactured by Linde Air Products and designated Linde Type 5A Molecular Sieve. The crystals of this particular calcium alumino-silicate have a pore size or opening of about 5 angstrom units, sufficiently large to admit straight chain hydrocarbons, such as the normal paraffins and the normal olefins, to the substantial exclusion of the non-straight chain hydrocarbons. This particular selective adsorbent is available in various sizes, e. g. in the form of ⅛" or 1/16" diameter pellets or as a finely divided powder having a particle size in the range 0.5–5.0 microns.

Other suitable solid molecular sieve type of adsorbents, which may be employed in the practice of this invention, include the synthetic or natural zeolites which, when dehydrated, may be described as crystalline zeolites having a rigid three dimensional anionic network and having interstitial dimensions sufficiently large to preferentially adsorb one particular type of hydrocarbons, e. g. straight chain hydrocarbons, to the substantial exclusion of other type of hydrocarbons, e. g. the non-straight chain hydrocarbons. The naturally occurring zeolite, chabazite, exhibits the property of selectively adsorbing straight chain hydrocarbons. Another suitable naturally occurring zeolite, analcite, $NaAlSi_2O_6.H_2O$, when dehydrated or when all or part of the sodium is replaced by an alkaline earth metal, such as calcium, by base exchange, yields a material represented by the formula $(Ca,Na)_2Al_2Si_4O_{12}.2H_2O$ which, after suitable conditioning, will absorb straight chain hydrocarbons to the substantial exclusion of non-straight chain hydrocarbons. Other naturally occurring synthetically prepared zeolites or alumino-silicates, such as phacolite, gmelinite, harmotome and the like or suitable base exchange modifications of these materials may also be employed as selective adsorbents in the practice of this invention.

Another alumino-silicate molecular sieve type of adsorbent, apparently a sodium faujasite, designated by the trade name Linde Type 13A Molecular Sieve, and possessing an effective pore size of about 13 angstroms, is a selective adsorbent for aromatic compounds, particularly aromatic hydrocarbons such as the higher molecular weight monocyclic and polycyclic aromatic hydrocarbons.

The selective adsorbent employed in the practice of this invention may initially be of any suitable form or shape, preformed tablets or cylinders, granular, spheroidal or microspheroidal.

In carrying out the practice of this invention a feed mixture, such as a hydrocarbon fraction containing straight chain hydrocarbons and non-straight chain hydrocarbons, is contacted with a slurry containing a solid, particle-form selective adsorbent. The above-indicated contacting operation may take place at any suitable temperature effective to accomplish selective adsorption of one of the components of the feed mixture undergoing treatment. Generally contact between the feed mixture and the adsorbent-containing slurry is effected at a temperature in the range 50–625° F., more or less. The contacting step may be carried out at any suitable pressure, such as a pressure in the range 0–10,000 p. s. i. g., higher or lower, the temperature and pressure being adjusted with respect to the mixture undergoing fractionation so as to maintain the mixture in the desired physical state, such as vapor phase, during the contacting operation. With respect to a slurry containing alumino-silicate type of molecular sieve adsorbents, it is preferred to carry out the contacting or adsorptive separation step at a temperature in the range 200–500° F.

In the practice of this invention the inert carrier liquid employed to form a slurry containing the solid, particle-form adsorbent material is preferably a high boiling inert liquid, that is, a material which is substantially unadsorbed or unaffected by the selective adsorbent admixed therewith and preferably a liquid which is a selective solvent for the component to be adsorbed from the feed mixture undergoing fractionation. Suitable carrier liquids include a high boiling petroleum fraction, such as a catalytic cycle gas oil, a lubricating or gas oil fraction, a thermal cycle gas oil or other similar high boiling petroleum fractions. Particularly suitable for use in the practice of this invention is diphenyl or diphenyl oxide or mixtures thereof, such as Dowtherm. Other suitable carrier liquids include the well known normally liquid selective solvents for polar organic compounds or for aromatic hydrocarbons such as the phenols, furfural, "Chlorex," as well as the normally liquid organic phosphates, borates and silicate, acyclic acid polymers (Acryloids), olefin polymers, e. g. polyisobutene, polypropylene, etc., alkylated aromatic hydrocarbons, e. g. $C_2–C_{20}$ alkylated benzenes, etc. It is preferred to employ a carrier liquid which is heat stable, i. e. is not easily thermally decomposed, and which has a boiling point or boiling range substantially greater than the boiling point or boiling point range of the mixture undergoing fractionation. Accordingly a carrier liquid having a boiling point in the range 300–900° F., more or less, is satisfactory provided the boiling point of the carrier liquid is substantially greater, e. g. by about 100–300° F., than the boiling point of the mixture undergoing fractionation.

After contact has been effected between the vaporized mixture to be fractionated and the slurry comprising inert carrier liquid and selective adsorbent, the slurry is recovered from the feed mixture undergoing treatment and subjected or heated to an elevated temperature sufficient to effect desorption of the adsorbed material contained in the selective adsorbent. The desorption operation is carried out at any suitable temperature or pressure effective to desorb the adsorbed material and whereby the resulting desorbed material is in the gaseous or vapor phase. Uusually a desorption temperature below or at about the normal boiling point of the carrier liquid is sufficient, such as a desorption temperature in the range 300–900° F., depending upon the boiling point of the materials contained adsorbed in the adsorbent under the conditions of desorption.

Various gaseous or vaporized mixtures may be treated in accordance with the practice of this invention for the separation and recovery of one or more components therefrom. Mixtures which may be treated in accordance with one embodiment of this invention wherein the adsorbent is a selective adsorbent for polar compounds include mixtures containing normally gaseous or normally liquid polar and non-polar compounds or polar and relatively less polar compounds. The practice of this invention is particularly applicable to the separation of gaseous or vaporized mixtures of hydrocarbons, such as gaseous or vaporized mixtures containing $C_4$ and/or $C_5$ and higher hydrocarbons, straight run naphthas, catalytic reformates (Platformates) and the like. Other petroleum refinery streams such as hydrocarbon mixtures containing straight chain hydrocarbons and non-straight chain hydrocarbons, or aromatic and non-aromatic hydrocarbons, are also suitable for treatment in accordance with this invention.

Various hydrocarbon mixtures or petroleum fractions which may be advantageously treated include a naphtha or gasoline fraction, such as a light and heavy straight run naphthas, boiling range 50–250° F. and 175–450° F., respectively, a diesel oil fraction, a kerosene fraction, a gas oil fraction and the like. A typical hydrocarbon fraction which may be treated for the removal of selected hydrocarbons or selected fractions therefrom might have a boiling point or boiling range in the range 40–600° F. and higher and, for example, containing a substantial amount of straight chain hydrocarbons, e. g. 2–35% by volume and higher. More particularly, a hydrocarbon fraction to be treated might have an initial boiling point in the range 40–300° F. and an end point in the range 150–600° F. and higher. A hydrocarbon fraction to be treated for the removal of straight chain hydrocarbons therefrom might have the following composition:

Hydrocarbon type: Percent by volume
Naphthenes _____ 0–75
Aromatics _____ 0–75
Acyclic saturates and unsaturates (including normal paraffins, isoparaffins, normal olefins and isoolefins) _____ 2–90

Referring now to the drawing which schematically illustrates one embodiment of the practice of this invention as applied to the fractionation of a gaseous or vaporized mixture of hydrocarbons, a vaporized hydrocarbon fraction such as a heavy straight run naphtha or a catalytic reformate having a boiling range in the range 150–425° F. is introduced via conduit 11 into the lower portion of a gas-liquid (slurry) contacting zone 12 which is maintained at a temperature of above about 425° F. and wherein the feed mixture passes upwardly in countercurrent contact with a slurry of a selective adsorbent such as a calcium alumino-silicate, e. g. Linde Type 5A Molecular Sieve, which selectively adsorbs straight chain hydrocarbons to the substantial exclusion of non-straight chain hydrocarbons. The solid alumino-silicate adsorbent is introduced via conduit 14 into the upper portion of contacting zone 12 as a slurry admixed with an inert carrier liquid. A suitable carrier liquid would be Dowtherm or a thermal or catalytic cycle gas oil having a boiling point in the range 500–750° F. A vaporized treated hydrocarbon fraction, naphtha or reformate, is withdrawn from the upper portion of contacting zone 12 via line 15. This treated hydrocarbon fraction contains a substantially reduced amount of straight chain hydrocarbons as compared with the hydrocarbon fraction introduced into contacting zone 12 via conduit 11.

Contacting zone 12 is schematically illustrated in the drawing as a baffled tower suitable for effecting contact between a gas and a liquid. If desired, contacting zone 12 may be a perforated plate tower, a packed tower or a bubble-cap plate type fractionating tower. In general, any suitable means or apparatus useful for promoting and/or effecting gas-liquid contact is suitable for use in and/or as a contacting zone 12 in accordance with this invention.

There issues from the lower portion of contacting zone 12 via conduit 16 a slurry of the selective adsorbent now containing adsorbed straight chain hydrocarbons. This slurry is heated in slurry heater 18 wherein its temperature is increased, preferably at least about 100–200° higher than the adsorption temperature maintained in contacting zone 12. The resulting slurry at a temperature in the range 500–700° F. issues from heater 18 via conduit 19 into vapor-slurry separator 20 from which the desorbed straight chain hydrocarbons are separately recovered via line 21. The remaining slurry now comprising substantially only the inert carrier liquid and the desorbed, regenerated adsorbent is recycled via line 14 for introduction into the upper portion of contacting zone 12 to contact additional hydrocarbon fractions.

It is an added feature of this invention to aid in the desorption and separation of the adsorbed material from the slurry of carrier liquid and adsorbent in vapor-slurry separator 20 by introducing thereinto via line 13 a gaseous stripping and sweeping medium such as methane, flue gas, carbon dioxide, superheated steam at desorption conditions of temperature and pressure, especially under conditions that substantially no adsorption or condensation of the stripping medium by the carrier liquid or adsorption of the stripping medium by the adsorbent takes place. Superheated steam is useful as the gaseous stripping medium since it can readily be separated from the resulting desorbed product by condensation. Also carbon dioxide is particularly suitable as the gaseous stripping medium since it can readily be separated from the resulting desorbed product by caustic washing or water washing under pressure and by other well known methods, recovered and recycled.

The following is exemplary of the practice of this invention. Slurries of Linde Type 5A Molecular Sieve, in powder and granular form, were prepared by mixing therewith liquid benzene. The resulting slurries were maintained at a temperature in the range 80–86° F. At the above temperatures there was introduced into the slurries gaseous normal butane. It was observed that the solid selective adsorbent present in the slurry adsorbed the gaseous normal butane introduced into contact therewith. Furthermore, it was determined that a slurry containing 25 cc. benzene and 7 grams of Linde Type 5A Molecular Sieve powder adsorbed and otherwise took up 1867 cc. of gaseous n-butane. It was further observed that a slurry comprising 25 cc. benzene and 14.0 grams Linde Type 5A Molecular Sieve adsorbed and otherwise consumed 1985 cc. of gaseous n-butane. It was observed that the alumino-silicate selective adsorbent adsorbed upwards of 13% by weight straight chain hydrocarbons such as normal butane.

For purposes of simplicity and ease of understanding the conventional associated equipment such as recycle lines, by-pass lines, valves, pumps, heat exchangers, flow regulators and the like have for the most part not been schematically illustrated in the drawings. The proper location and employment of these items in the practice of this invention is considered well known to and within the skill of those skilled in the art to which this invention appertains.

As will be apparent to those skilled in the art many modifications, changes and alterations may be made in the practice of this invention without departing from the spirit or scope thereof.

I claim:

1. A method of fractionating a vaporized hydrocarbon mixture containing straight chain hydrocarbons and non-straight chain hydrocarbons which comprises contacting said vaporized mixture with a slurry comprising a relatively high boiling, inert carrier liquid and a solid, particle form calcium alumino-silicate adsorbent, said carrier liquid having a boiling point higher than the boiling point of the straight chain hydrocarbons to be adsorbed and being a selective solvent for the straight chain hydrocarbons to be adsorbed from the feed mixture undergoing fractionation as well as being substantially unadsorbed by said adsorbent, said calcium alumino-silicate adsorbent preferentially adsorbing the straight chain hydrocarbons contained in said mixture to the substantial exclusion of the non-straight chain hydrocarbons, said adsorbent being suspended in said carrier liquid as a fluent liquid-solids slurry, separating the resulting slurry containing adsorbed straight chain hydrocarbons from the resulting treated vaporized hydrocarbon mixture, heating the separated slurry to effect desorption of the adsorbed straight chain hydrocarbons and contacting the resulting slurry containing regenerated solid adsorbent with additional said vaporized hydrocarbon mixture.

2. A method in accordance with claim 1 wherein said high boiling inert carrier liquid is a relatively high boiling hydrocarbon.

References Cited in the file of this patent

UNITED STATES PATENTS

| | | |
|---|---|---|
| 214,412 | Lugo | Apr. 15, 1879 |
| 1,234,600 | Allen | July 24, 1917 |
| 1,429,856 | Etter | Sept. 19, 1922 |
| 2,306,610 | Barrer | Dec. 29, 1942 |
| 2,760,598 | Dietz et al. | Aug. 28, 1956 |
| 2,768,942 | Marple et al. | Oct. 30, 1956 |